United States Patent
Kuehn et al.

[11] Patent Number: 6,088,631
[45] Date of Patent: Jul. 11, 2000

[54] SYSTEM FOR CONTROLLING OPERATING SEQUENCES IN A MOTOR VEHICLE

[75] Inventors: Willi Kuehn, Markgröningen; Manfred Meissner, Marbach; Edwin Sixt, Weinstadt, all of Germany

[73] Assignee: Robert Bosch GmbH, Stuttgart, Germany

[21] Appl. No.: 09/046,792

[22] Filed: Mar. 24, 1998

[30] Foreign Application Priority Data

Mar. 25, 1997 [DE] Germany ............................ 197 12 445

[51] Int. Cl.$^7$ .................................................. G05D 23/00
[52] U.S. Cl. ................................... 701/1; 477/76; 477/98
[58] Field of Search .................................. 701/51, 53, 62, 701/29, 65, 67, 1; 477/72, 76, 98, 906; 475/117

[56] References Cited

U.S. PATENT DOCUMENTS

| | | | |
|---|---|---|---|
| 4,531,432 | 7/1985 | Inagaki et al. | 74/866 |
| 4,567,969 | 2/1986 | Makita | 192/3.56 |
| 5,070,746 | 12/1991 | Milunas et al. | 74/866 |
| 5,788,148 | 8/1998 | Burner et al. | 237/2 A |
| 5,857,162 | 1/1999 | Vukovick et al. | 701/62 |

FOREIGN PATENT DOCUMENTS 2182723   5/1987   United Kingdom .

OTHER PUBLICATIONS

"Kraftfahrtechnisches Taschenbuch", 21st edition, Robert Bosch GmbH, p. 100. (Year not available).
"Kraftfahrtechnisches Taschenbuch", 21st edition, Robert Bosch GmbH, pp. 536 to 553. (Year not available).

*Primary Examiner*—Tan Nguyen
*Assistant Examiner*—Dalena Tran
*Attorney, Agent, or Firm*—Walter Ottesen

[57] ABSTRACT

The invention is directed to a system for controlling operating sequences in a motor vehicle having an electronic circuit controlling (open loop and/or closed loop) the operational sequences. A temperature detecting device is provided which is mounted so as to be in thermal contact at least with parts of the electronic circuit and detects a temperature value representing the temperature of this part. A determination is made whether the detected temperature value of at least one of at least two different threshold values is exceeded. Different measures are then initiated in dependence upon which of the different threshold values is exceeded. The system considers the occurrence of high temperatures in that the system itself detects a damaging temperature and reacts appropriately by different measures to different high temperatures.

15 Claims, 1 Drawing Sheet

6,088,631

SYSTEM FOR CONTROLLING OPERATING SEQUENCES IN A MOTOR VEHICLE

FIELD OF THE INVENTION

The invention relates to a system for open-loop and/or closed-loop control of operating sequences in a motor vehicle.

BACKGROUND OF THE INVENTION

Systems having electronic components are known wherein cooling elements (heat emittance via metallic contact) are provided for cooling the electronic components. At very high temperatures, such as over 140° C., the electronic components become thermally overloaded and are destroyed.

Systems for controlling automatic or automated transmissions including converter control and/or clutch control are known in many forms. In this connection, reference can be made to the text "Kraftfahrtechnisches Taschenbuch", 21st edition, pages 536 to 553, and published by Robert Bosch GmbH.

Furthermore, systems are known under the term "Mechatronik" wherein mechanical, hydraulic, electronic and data processing parts are integrated in a tight space. In this connection, reference can be made to the above text at page 100. Especially in such systems, the electronic components must be effectively protected against temperatures which are too high.

SUMMARY OF THE INVENTION

It is an object of the invention to provide an effective protection for electronic components against high temperatures.

The system of the invention is for controlling the operating sequences for a motor vehicle. The system includes: an electronic circuit having a plurality of parts for coacting to control the operating sequences; first means mounted so as to be in thermal contact with at least one of the parts and detecting a temperature value (T) representing the temperature of the at least one part; second means for recognizing whether the temperature value (T) exceeds at least one of at least two different threshold values ($T_1$, $T_2$, $T_{limit}$); third means for initiating different measures (S, INH, S') in accordance with which one of the different threshold values ($T_1$, $T_2$, $T_{limit}$) is exceeded.

The invention proceeds from a system for controlling (open-loop and/or closed-loop) operating sequences in a motor vehicle having an electronic circuit for controlling (open-loop and/or closed-loop) the operating sequences. Furthermore, temperature detecting means are provided which are mounted so as to be in thermal contact with at least parts of the electronic circuit and which detect a temperature value representing the temperature of this part. The essence of the invention is that means are provided with which a detection can be made as to whether the detected temperature value exceeds at least one of at least two different threshold values. Different measures are then initiated in dependence upon which of the different threshold values is exceeded.

The system of the invention considers the occurrence of high temperatures in that the system automatically detects a damaging temperature and reacts in an appropriate manner with different measures to differently high temperatures.

In an advantageous embodiment of the invention, such an appropriate measure is that, when a first lower temperature threshold value is exceeded, the operating sequences are limited to such operating sequences which produce less heat or heat dissipation.

In a further advantageous embodiment of the invention, an appropriate measure is that, when a second higher threshold value is exceeded, parts of the circuit are inhibited with respect to their operation. Such circuit parts include especially output stage circuits and/or digital circuit parts. A mechanical, hydraulic and/or electrical emergency arrangement is provided especially for those parts which are taken out of operation.

Especially advantageous is that embodiment of the invention wherein the electronic circuit has at least one more temperature-sensitive first component and one less temperature-sensitive second component (more temperature resistant). The temperature detecting means are then mounted so as to be at least in thermal contact with the first part and detect a temperature value representing the temperature of the first part. Here, it is especially provided that the first and second parts are spatially joined to form a unit in the sense of the above-mentioned Mechatronik.

Here too, when it is detected that a first lower threshold is exceeded, the provision can be made that the operating sequences are limited to those operating sequences which produce less heat or have less heat dissipation.

When a second higher threshold value is exceeded, it can be provided that the less temperature-sensitive second part assumes, at least partially, the controlling (open-loop and/or closed-loop) functions of the more temperature-sensitive first part. Here, it is especially provided that the less temperature-sensitive second part maintains, as a function, an emergency program such as only a converter clutch drive in a transmission control system. For this configuration, a system having two computers is postulated. The more temperature-sensitive main computer determines the operating sequences during normal operation; whereas, the less temperature-sensitive ancillary computer assumes specific operating sequences (especially in the context of an electronic, hydraulic or mechanical emergency function) only when a specific temperature threshold value is exceeded wherein the proper function of the main computer is no longer guaranteed.

Here, it is especially advantageous that the less temperature-sensitive second part, that is the ancillary computer, assumes monitoring functions for the more temperature-sensitive first part, for the main computer, during normal operation (where there is no detection of a temperature threshold value being exceeded).

When a third, still higher temperature threshold value (the limit temperature) is exceeded, the less temperature-sensitive second part inhibits at least parts of the circuit, such as output stage circuits and/or digital circuit parts. A mechanical, hydraulic and/or electric/electronic emergency function is provided for the parts taken out of operation.

It is especially advantageous that the less temperature-sensitive second part includes a memory which stores at least the following: the duration of a detected temperature being exceeded and/or the particular temperature threshold value which was exceeded and/or the detected temperature during the time that a limit was exceeded. This facilitates, inter alia, the diagnosis of a fault which lead to overheating. Furthermore, the operating state which lead to the increased temperature can be stored.

Alternatively, the provision can be made that the less temperature-sensitive second part transmits the following to an external memory: the duration of at least one situation wherein the temperature has exceeded a limit and/or the particular temperature threshold value which was exceeded and/or the detected temperature during the time the temperature exceeded the limit.

The controlled operating sequences can be an electromechanical and/or electrohydraulic system and/or a Mechatronik. Here, it can be especially provided that this system is a transmission control apparatus wherein at least parts of the transmission control electronic and parts of the transmission control hydraulic are integrated into a structural unit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
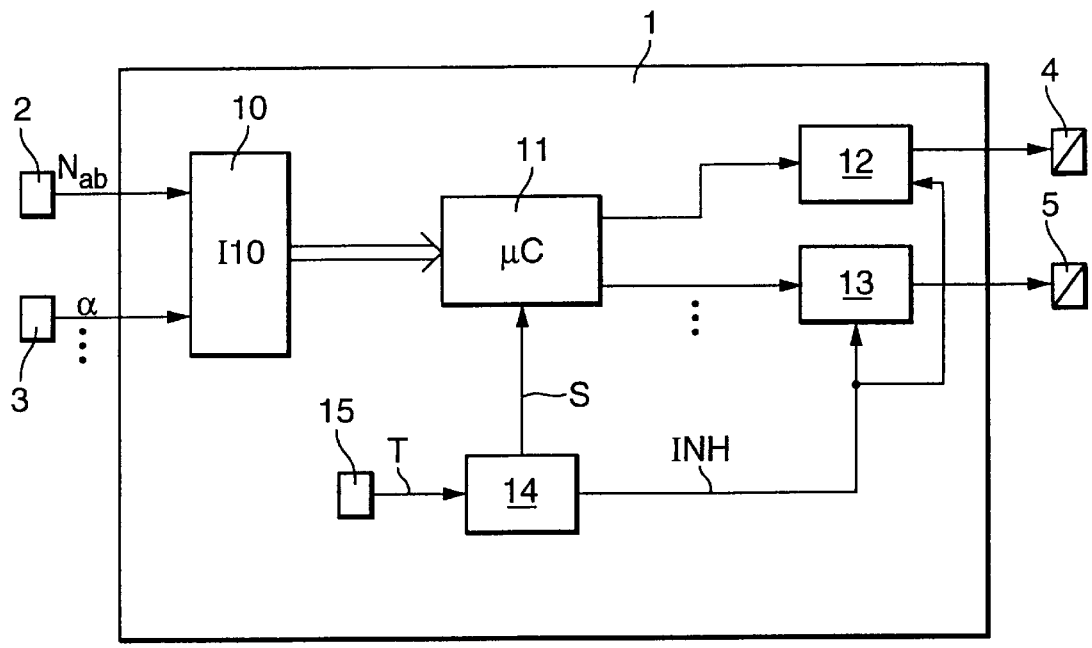
FIG. 1 is a block circuit diagram of a first embodiment of the invention.
Figure 2:
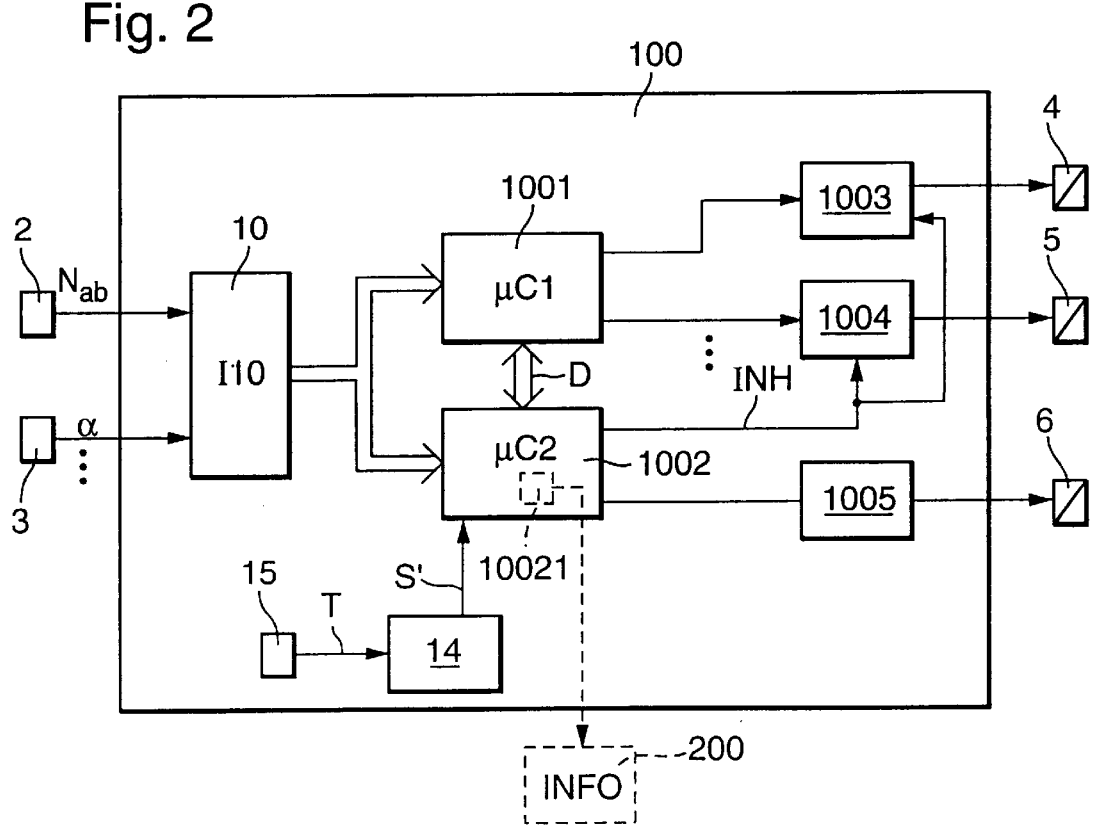
FIG. 2 is a block circuit diagram of a second embodiment of the invention.

In FIGS. 1 and 2, the invention is shown with respect to the integration of a transmission control electronic and a transmission control hydraulic. In the transmission, ambient temperatures of 140° C. to 160° C. can occur. The invention considers these high temperatures in that the electronics monitor their own temperature. The entire system transfers into a defined state when specific threshold values are exceeded.

Reference numerals 1 and 100 in FIGS. 1 and 2, respectively, identify electronic circuits for controlling the operational sequences in a transmission control. These circuits are provided with different input signals from blocks 2 and 3, such as the transmission output rpm Nab, the driver pedal position α, et cetera. The input signals are prepared for further processing in the input/output unit 10. The actuating elements (magnetic valves, pressure control valves) 4, 5 and 6 are driven in dependence upon the input signals via the output stages 12 and 13 (FIG. 1) or 1003 and 1004 (FIG. 2).

The temperature T of the entire component (1 or 100) or the main computer (11 or 1001) is detected with the temperature sensor 15. The temperature sensor 15 is in thermal contact with the particular unit.

In block 14, the detected temperature T is compared to three threshold values:

$$T_1 < T_2 < T_{limit}$$

wherein the temperature threshold value $T_1$ is selected in such a manner that, when $T_1$ is exceeded, a proper operation of the electronics is, on the one hand, still ensured while, on the other hand, a further, more intense, increase of the temperature must be avoided. When the value $T_2$ is exceeded, a proper operation of at least parts of the electronics is no longer guaranteed; whereas, for a limit temperature $T_{limit}$, damages can be expected.

Block 14, as part of the electronics, must be configured to be especially temperature resistant or temperature insensitive. If, in block 14, the first threshold $T_1$ is exceeded, $$T_1 < T < T_2 < T_{limit},$$

then the signal S (FIG. 1) or S' (FIG. 2) is outputted. In reaction thereto, the electronic (especially the main computer (11 or 1001) begins to limit the heat developing in the transmission by changing the operational sequence (software sequence). This can take place with the following measures:

(a) selection of transmission shift characteristic lines which are more favorable with respect to temperature;

(b) limiting the maximum engine rpm;

(c) limiting the maximum engine torque;

(d) closing the converter clutch at lower speeds than in normal operation or continuous closure of the converter clutch;

(e) exclusion of apparent operational errors via plausibility decisions, such as:
  (i) blocking a transmission actuation (gear selection) selected manually by the driver in order not to permit transmission gear ratios which are unfavorable with respect to the development of temperature;
  (ii) preventing transmission warming for simultaneous braking of the vehicle (parking brake) and accelerator pedal actuation by the driver;

(f) additional measures can be initiated outside of the transmission such as switching on the cooling ventilator;

(g) actuating a signal lamp, which is mounted in the viewing field of the driver, to warn as to excessive temperature.

Two variations are provided when the threshold $T_2$ is exceeded.

In the variation shown in FIG. 1, the block 14 switches, via outputting the signal INH, parts of the transmission control (such as the output stages 12 and 13 and/or digital parts 11) so that no current flows. The less temperature resistant or more temperature-sensitive part of the electronics is thereby transferred into a passive state and can therefore be subjected to higher temperatures.

The entire transmission control system operates as if the switched-off part of the electronics is in a reset state, that is, a state which must lead to a safer state when viewed in the context of the system of a transmission control (so-called hydraulic emergency).

In this variation, the block 14 can comprise a simple circuit part which can only switch off the residual electronics but remains operational up to the highest temperatures.

In the variation shown in FIG. 2, the especially temperature resistant or less temperature-sensitive part of the electronics includes an additional ancillary computer 1002 by means of which the operational sequences can be maintained even at higher temperatures, at least in the sense of an emergency program. The main computer 1001 is then configured to be less temperature resistant, that is, temperature sensitive. The block 14 can be a component of the ancillary computer.

In normal operation (no critical temperature is present), the ancillary computer 1002 executes monitoring functions of the main computer 1001. For this purpose, the computers are mutually connected via a data line D. In this way, one reaches the two-computer concept.

In the case of a fault of main computer 1001 or its output stages or in electrical emergency (that is, when threshold $T_2$ is exceeded), $$T_1 < T_2 < T < T_{limit},$$

the ancillary computer 1002 can do the following:

(a) switch the main computer 1001 and its output stages 1003 and 1004 (pressure controller and magnetic valves) to be without current (signal INH);

(b) control, as sole output stage driver, for example, only the converter clutch (output stage 1005, actuating element 6). The drive of the converter clutch can, for example, only take place in dependence upon the transmission output rpm Nab. As an example herefor, the transmission should (for example, for a five-gear transmission) be in the fourth gear. By the sole actuation of the converter clutch, the total system then still has an acceptable functionality in emergency operation. By closing the converter clutch starting at a specific lower output rpm, the transmission energy loss can be maintained at a reduced level. When the limit temperature is exceeded $$T_1<T_2<T_{limit}<T,$$

the ancillary computer switches all remaining electronic modules so that they are without current.

As already mentioned, it is especially advantageous when a storage and documentation of the high temperature state takes place. For this purpose, the following measures are provided:

(a) as long as the computers 1001 and 1002 operate, the duration of the presence of increased temperature is documented and stored in memory 10021. The documentation is shown in FIG. 2 as a component of the ancillary computer 1002 as an example.

(b) When the transmission control must switch off, then, shortly therebefore, the information INFO as to temperature level and duration is transmitted to an external memory 200 and is there stored. The memory 200 is not subjected to the excess temperature and can, for example, be in the engine control. The memory 200 stores the information for call-up. The memory 200 can also be disposed within the ancillary computer;

(c) in the event that the transmission control again signalizes readiness to receive because of a normalization of temperature, then the stored information as to the defective state is again transmitted to the transmission control;

(d) possible overloading in the transmission such as damage to the hydraulic fluid because of an increased temperature can thereby be documented and stored. This can, for example, be useful for service (for example, exchange of the liquid) and/or for a repair.

It is understood that the foregoing description is that of the preferred embodiments of the invention and that various changes and modifications may be made thereto without departing from the spirit and scope of the invention as defined in the appended claims.

What is claimed is:

1. A system for controlling the operating sequences for a motor vehicle, the system comprising:

an electronic circuit having a plurality of parts for coacting to control said operating sequences;

first means mounted so as to be in thermal contact with at least one of said parts and detecting a temperature value (T) representing the temperature of said at least one part;

second means for recognizing whether said temperature value (T) exceeds at least one of at least two different threshold values ($T_1$, $T_2$, $T_{limit}$);

third means for initiating different measures (S,INH, S') in accordance with which one of said different threshold values ($T_1$, $T_2$, $T_{limit}$) is exceeded;

a first one ($T_1$) of said threshold values ($T_1$, $T_2$, $T_{limit}$) being lower than the remainder of said threshold values ($T_2$, $T_{limit}$) and, said operating sequences being limited to such operating sequences which produce less heat or exhibit heat loss when a detection is made that said first threshold value ($T_1$) is exceeded.

2. The system of claim 1, wherein a second one ($T_2$) of said threshold values ($T_1$, $T_2$, $T_{limit}$) is higher than said first threshold value ($T_1$); and, wherein selected parts of said plurality of parts are inhibited and an emergency function is initiated for said selected parts when a detection is made that said second threshold value ($T_2$) is exceeded.

3. The system of claim 2, wherein said emergency function is a mechanical, hydraulic and/or electrical emergency function.

4. The system of claim 1, wherein controlled operating sequences can be an electromechanical and/or electrohydraulic system and/or a Mechatronik; and, said system is a transmission control apparatus wherein at least parts of the transmission control electronic and parts of the transmission control hydraulic are integrated into a structural unit.

5. The system of claim 1, wherein the control of said operating sequences is an open-loop and/or closed-loop control.

6. A system for controlling the operating sequences for a motor vehicle, the system comprising:

an electronic circuit having a plurality of parts for coacting to control said operating sequences;

first means mounted so as to be in thermal contact with at least one of said parts and detecting a temperature value (T) representing the temperature of said at least one part;

second means for recognizing whether said temperature value (T) exceeds at least one of at least two different threshold values ($T_1$, $T_2$, $T_{limit}$);

third means for initiating different measures (S,INH, S') in accordance with which one of said different threshold values ($T_1$, $T_2$, $T_{limit}$) is exceeded;

a first part of said plurality of parts being a more temperature sensitive part and a second part of said plurality of parts being a less temperature sensitive part; and, said first means being in thermal contact at least with said first part to detect a temperature value (T) representing the temperature of said first part.

7. The system of claim 6, said first and second parts being spatially joined to a unit.

8. The system of claim 6, said first and second parts being spatially separated from each other.

9. The system of claim 6, wherein a second one ($T_2$) of said threshold values ($T_1$, $T_2$, $T_{limit}$) is higher than a first one ($T_1$) of said threshold values ($T_1$, $T_2$, $T_{limit}$); and, wherein said second part assumes, at least in part, the controlling functions of said first part when a detection is made that said second threshold temperature ($T_2$) is exceeded.

10. The system of claim 9, wherein said second part is maintained as an emergency function including only a converter clutch drive in a transmission control system.

11. The system of claim 9, wherein a third one ($T_{limit}$) of said threshold values ($T_1$, $T_2$, $T_{limit}$) is higher than both said first and second threshold values ($T_1$, $T_2$); said less temperature sensitive second part inhibiting at least some parts of said electronic circuit when a detection is made that said third threshold value ($T_{limit}$) is exceeded; and, an emergency function is provided for said some parts which have been inhibited.

12. The system of claim 11, wherein said some parts include output stage circuits and/or digital circuit components; and, said emergency function being a mechanical, hydraulic and/or electric emergency function.

13. The system of claim 6, wherein said second means transmits the following to an external memory: the duration of at least one situation wherein the temperature has exceeded a limit and/or the particular temperature threshold value which was exceeded and/or the detected temperature during the time the temperature exceeded the limit.

14. The system of claim 6, wherein said second part includes a memory which stores at least the following: the duration of a detected temperature being exceeded and/or the particular temperature threshold value which was exceeded and /or the detected temperature during the time that a limit was exceeded.

15. The system of claim 6, wherein said second part assumes monitoring functions for said first part during normal operation (where there is no detection of a temperature threshold value being exceeded).

* * * * *